(12) United States Patent
Schreiber et al.

(10) Patent No.: US 11,301,353 B2
(45) Date of Patent: Apr. 12, 2022

(54) SOFTWARE CONVERSION DOWNTIME PREDICTION TOOL

(71) Applicant: SAP SE, Walldorf (DE)

(72) Inventors: Peter Schreiber, Wiesloch (DE); Peter Datsichin, Hannover (RU); Michael Wirtz, Stutensee (DE); Anton Golubev, Bad Schonborn (RU); Mathias Klein, Waghaeusel (DE)

(73) Assignee: SAP SE, Walldorf (DE)

( * ) Notice: Subject to any disclaimer, the term of this patent is extended or adjusted under 35 U.S.C. 154(b) by 58 days.

(21) Appl. No.: 16/866,332

(22) Filed: May 4, 2020

(65) Prior Publication Data

US 2021/0342246 A1 Nov. 4, 2021

(51) Int. Cl.
*G06F 11/34* (2006.01)
*G06F 8/51* (2018.01)
*G06F 17/18* (2006.01)

(52) U.S. Cl.
CPC .......... *G06F 11/3428* (2013.01); *G06F 8/51* (2013.01); *G06F 11/3452* (2013.01); *G06F 17/18* (2013.01)

(58) Field of Classification Search
CPC ........ G06F 17/18; G06F 11/3452; G06F 8/51; G06F 11/3428
USPC ........................................................ 702/186
See application file for complete search history.

(56) References Cited

U.S. PATENT DOCUMENTS

| 2005/0071285 A1* | 3/2005 | Laicher ............. G06Q 40/12 705/400 |
| 2005/0071286 A1* | 3/2005 | Laicher ............. G06Q 40/12 705/400 |
| 2005/0071348 A1* | 3/2005 | Laicher ............. G06Q 10/10 |

* cited by examiner

*Primary Examiner* — John H Le
(74) *Attorney, Agent, or Firm* — Fountainhead Law Group P.C.

(57) ABSTRACT

Downtime resulting from converting a software program from a source system to a target system, is forecast, explored, and optimized. A benchmark for a practice conversion test run (including a downtime component) is received as a first input and displayed for exploration. A second input is received comprising a statistic stored in a conversion database and reflecting a prior actual software conversion process run. The benchmark and the statistic are processed with reference to an expert rule set, to generate an optimized result comprising an updated benchmark having a changed downtime component. The updated benchmark including the changed downtime component, is displayed. Processing may occur in conjunction with further input comprising an acceptance of a generated recommendation, and/or changing a data volume of the practice conversion test run. Embodiments may feed back to the conversion database, statistics resulting from a formal software conversion run conducted according to the optimized result.

13 Claims, 11 Drawing Sheets

SOFTWARE CONVERSION DOWNTIME PREDICTION TOOL

BACKGROUND

Unless otherwise indicated herein, the approaches described in this section are not prior art to the claims in this application and are not admitted to be prior art by inclusion in this section.

As part of a project to switch between database vendors, the expected duration of the business downtime is of essential interest for a customer. This is because the customer will be unable to actually use the system until the conversion process is completed.

One approach to estimating business downtime, is to perform a standard conversion test run with a copy of the productive system, in advance of the actual conversion. However if during the later actual conversion process, the expected window for business downtime is not achieved, productivity of the customer can be adversely impacted.

SUMMARY

Embodiments allow exploration and forecasting of downtime resulting from conversion of a software program from a source system to a target system. A first input comprising a benchmark for a practice conversion test run is received, the benchmark including a downtime component. The benchmark is displayed at a user interface. A second input is received comprising a statistic stored in a conversion database and reflecting a prior actual software conversion process run. The benchmark and the statistic are processed with reference to an expert rule set, to generate an optimized result comprising an updated benchmark having a changed downtime component. The updated benchmark including the changed downtime component, is displayed at the user interface. In some embodiments, the processing occurs in conjunction with a further input comprising an acceptance of a generated recommendation. In certain embodiments, the processing occurs in conjunction with a further input changing a data volume of the practice conversion test run. Embodiments may feed back to the stored conversion database, statistics resulting from a formal software conversion run conducted according to the optimized result.

The following detailed description and accompanying drawings provide a better understanding of the nature and advantages of various embodiments.

DETAILED DESCRIPTION

Described herein are methods and apparatuses that implement software downtime prediction. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
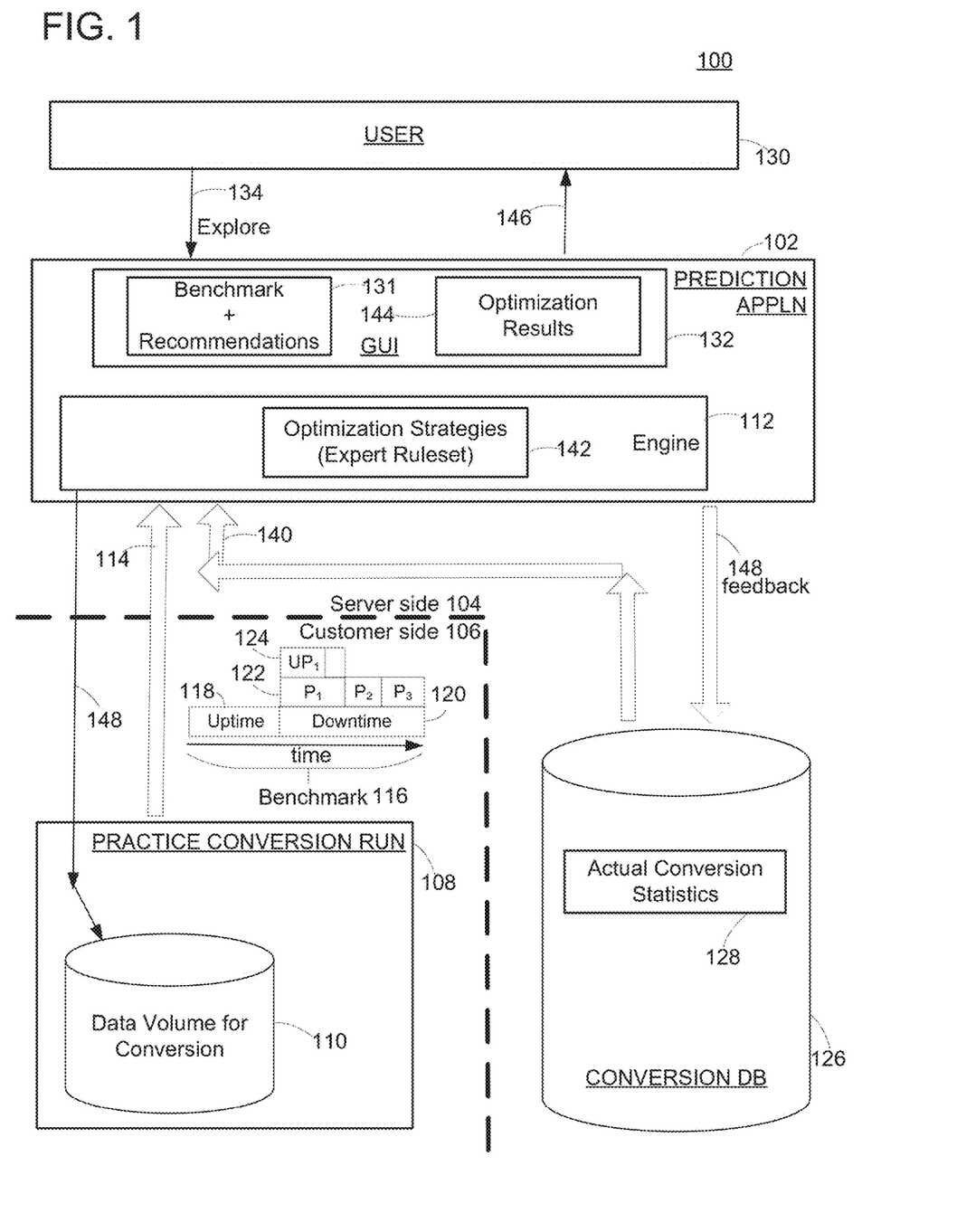
FIG. 1 shows a simplified diagram of a system according to an embodiment.

FIG. 1 shows a simplified view of an example system that is configured to implement software downtime prediction according to an embodiment. Specifically, system 100 comprises software downtime prediction application 102 located on a server side 104.

The software downtime prediction application is in communication with a customer side 106 that includes a practice conversion run 108 of a data volume 110. In particular, an engine 112 of the prediction application receives as a first input 114, a benchmark 116 comprising a system Uptime 118 and a system Downtime 120.

The system Downtime is composed of constituent phases 122. Each such phase may in turn be made up of underphases 124. Further details regarding phases and underphases are described below, including within the example.

The engine receives the benchmark from the customer side. A Graphical User Interface (GUI) 132 of the prediction application provides a display 131 of the benchmark to the user 130.

The GUI further affords the user the ability to explore 134 details of the benchmark in an intuitive manner, as is discussed later below in connection with the example. Such benchmark details can include but are not limited to: Uptime duration (e.g., dd:hh:mm), phase identity, phase duration, underphase identity, underphase duration, and others.

The engine of the prediction application is also in communication with a conversion database 126. This conversion database stores detailed statistics 128 regarding actual previous software conversion processes conducted for a number of different customers.

The engine receives actual past conversion statistics as a second input 140. Then, the engine processes the first input (benchmark) and the second input (prior statistics) with reference to a set of optimization strategies 142 in the form of a ruleset compiled from expert knowledge.

Based upon this processing, the engine can recommend possible optimizations for the benchmark, that can serve to reduce Business Downtime and increase Uptime, thereby enhancing productivity of the user during the software conversion. Recommendations resulting from this optimization processing are also displayed to the user in the GUI.

Then, based upon user exploration input (e.g., accepting recommendations, proposing ad hoc optimizations, and/or providing further input), the engine may process the benchmark according the expert ruleset and past conversion statistics, to provide optimization results 144 for an updated conversion process as an output 146 to the user.

As noted above, in some cases a user may provide further input 148 to the benchmark as part of the optimization process. This further input can alter the size of the data volume for purposes of performing conversion optimization. This is discussed later below in terms of a housekeeping function of the example.

Based upon receipt and detailed review the optimization results afforded by the exploration functionality, the user can now better understand the software conversion process, the substituent phases/underphases contributing to business downtime duration, and the likely effect of implementing one or more optimizations thereon. All of this knowledge is made available in advance of the customer having to actually commit to perform the formal software conversion run, so that Business Downtime can be reduced ahead of time.

Embodiments may also be configured to receive as feedback, statistics from actual formal running of the software conversion process (e.g., according to optimizations). Then, the engine can communicate this feedback 148 to further contribute to the corpus of stored data statistics, thereby enhancing accuracy of subsequent software conversion forecasts.

Figure 2:
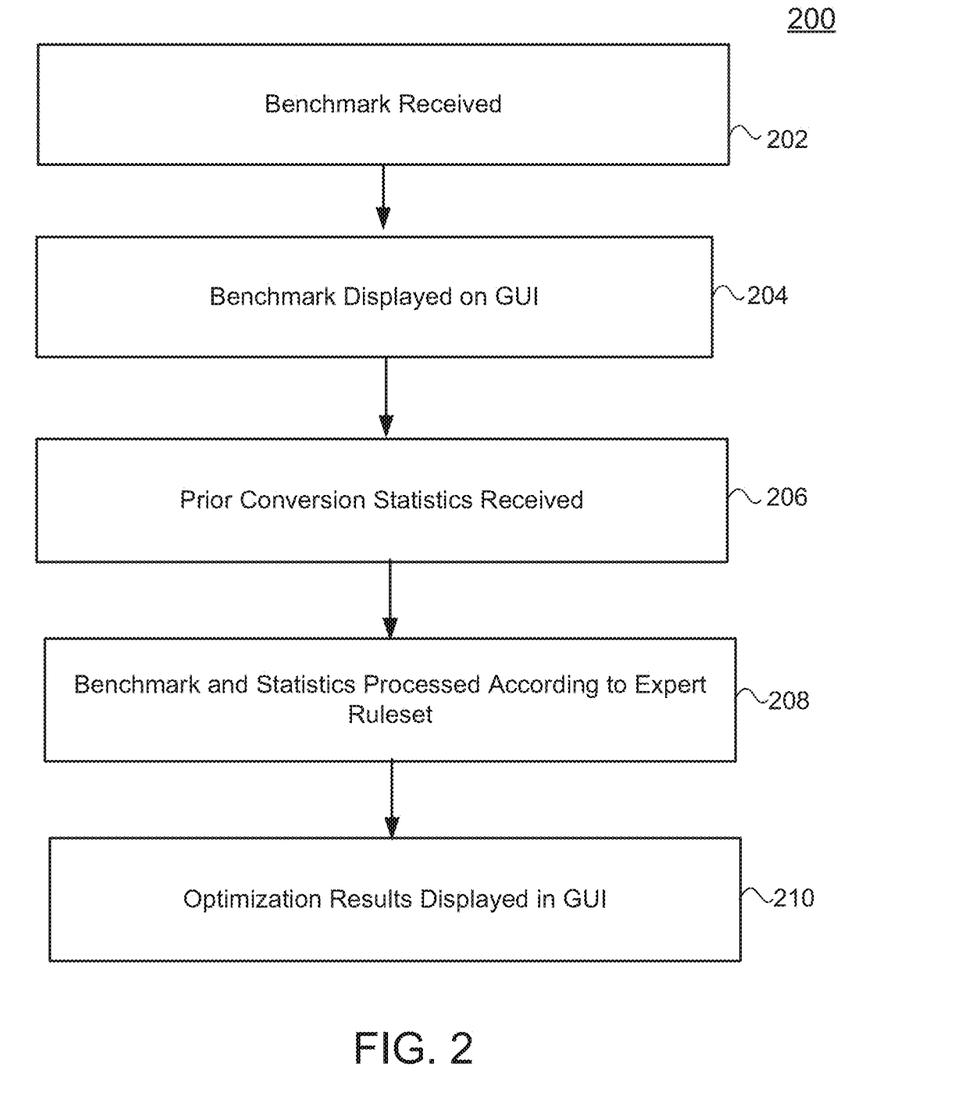
FIG. 2 shows a simplified flow diagram of a method according to an embodiment.

FIG. 2 is a flow diagram of a method 200 according to an embodiment. At 202, a benchmark for a practice conversion run is received.

At 204, the benchmark including constituents of business downtime phase(s), are displayed in a GUI. At 206, prior actual software conversion statistics are received.

At 208, the benchmark and the statistics are processed with reference to optimization strategies in the form of an expert ruleset. As a result of this processing, at 210 optimization results in the form of an updated benchmark are communicated to the user for further exploration.

It is noted that embodiments of software downtime prediction tool may offer one or more benefits. For example, a prediction tool may be relatively lightweight and easily consumed (e.g., on a client-side) in order to aid customers in planning their conversion project (and especially in accurately forecasting an expected duration of business downtime).

Moreover, rather than demanding the attention of specialized consultants to answer questions regarding predicted downtime, forecasts offered by embodiments rely upon individual results from the customer. That input, combined with statistical research compiled from numerous past conversions, can provide a forecast that is as accurate as possible.

Further details regarding software conversion downtime prediction according to embodiments, are now provided in connection with the following example.

Example

The SAP S/4HANA data processing platform is available from SAP SE of Walldorf, Germany. In this example, a customer is seeking to convert from:
•a legacy SAP ECC 6.0 EhP1 SP12 source system supported by an ORACLE 12/1.7 TB database, to •a SAP S/4HANA 1909 FPS1 target system supported by a SAP HANA 2.0/0.8 TB database.

SAP SE offers various technologies to decrease the business downtime resulting from such a conversion process. Customers are now eager to understand how much each such different optimization could contribute to decrease the business downtime.

However, it is costly (in time and money) for customers to validate each and any of these offerings. Accordingly, customers may seek greater precision regarding expected business downtime.

Figure 3:
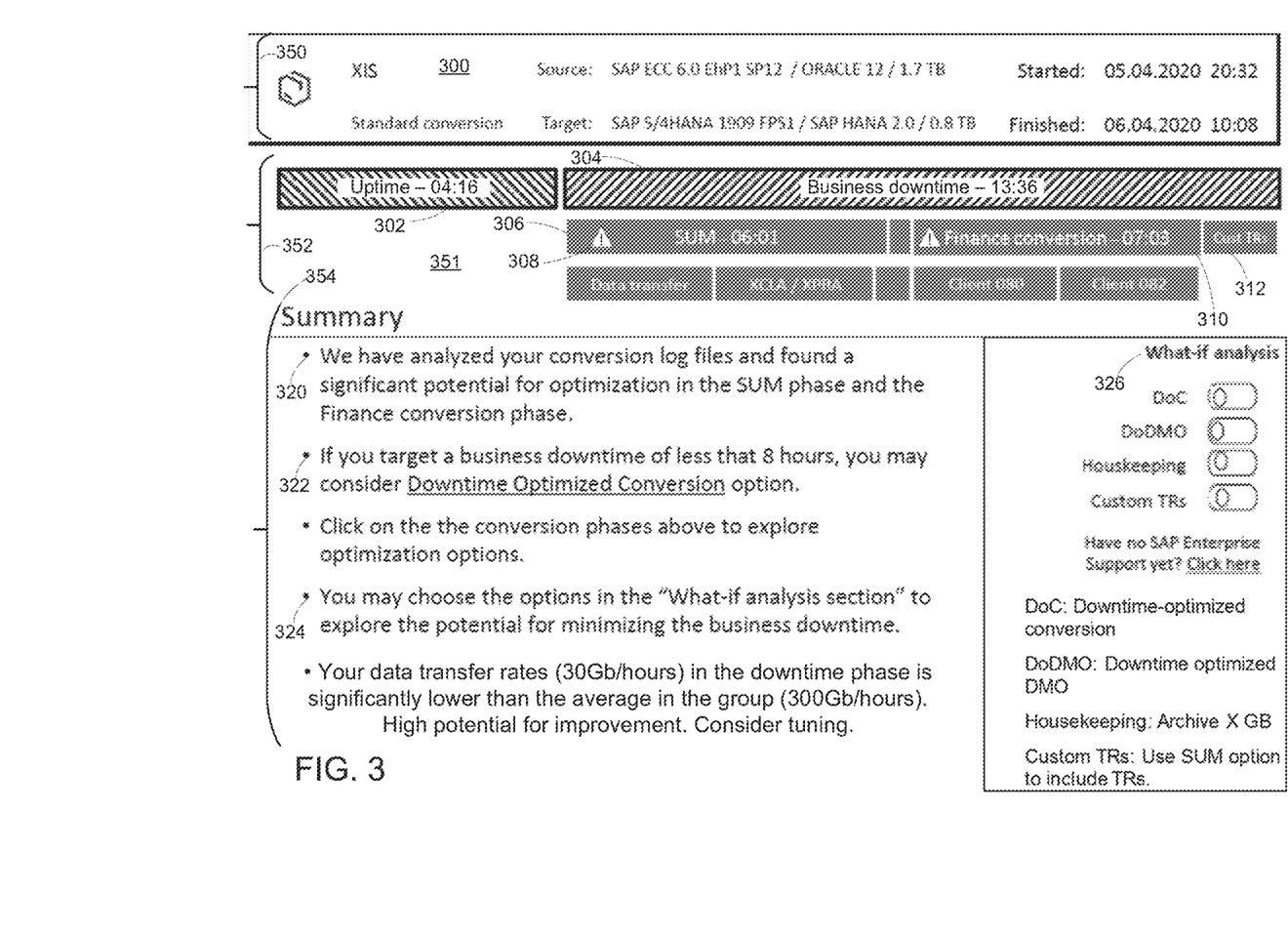
FIGS. 3-4 illustrate user interface screens of a downtime prediction program according to an example.

FIG. 3 shows a simplified view of a first screen 300 of a user interface according to the example. This exemplary screen presents software conversion information in three areas: an event header area 350, an event duration area 352, and an event details area 354.

Here, the event header area indicates the source and target system. The event header area further indicates that the customer has performed an overnight conversion practice test run started at: 8:32 PM on Apr. 5, 2020, and concluded at: 10:08 AM on Apr. 6, 2020. The total duration of the conversion procedure is thus 17:52.

The customer receives a benchmark 351 reflecting a duration of 04:16 for the expected uptime 302. This uptime is displayed by a bar having a first color (e.g., green to show the favorable nature of the uptime).

The benchmark further shows a duration of 13:36 for the expected business downtime 304 of the benchmark. This business downtime is displayed by a bar having a second color different from the first color (e.g., red to show the disfavored nature of the business downtime).

As shown in the exemplary UI screen of FIG. 3, the business downtime may be attributable to at least three major activities. First is the technical downtime of 06:01 that is attributable to activity of the Software Update Manager (SUM) component 306.

The relatively sizeable contribution of SUM to business downtime, may be visually conveyed in at least two ways. First, the length of the SUM bar is nearly half of that of the business downtime bar. Second, an icon 308 is added to the SUM bar.

A second activity contributing to the business downtime is the conversion of the financial data 310 with Implementation Guide (IMG). Here, that conversion activity accounts for 07:03 of the business downtime.

A third activity of the business downtime according to this example, is the import of customer TRansports (TRs) 310. While the specific duration of this third activity is not explicitly shown in FIG. 3, it is quantitatively less than the other contributors to business downtime, and could be revealed by a user clicking on the Cust TRs bar.

Utilizing the prediction tool according to embodiments, a customer can check for the contribution of various particular optimization(s) in influencing these benchmark results.

The prediction tool receives as a first input, the individual benchmark results of the customer. In the UI screen of FIG. 3, those results include the duration of the finance conversion.

As a second input, the prediction tool receives statistical data stored in an internal conversion database. That conversion database includes large volumes of data compiled from customers reporting their actual results after a number of official conversion processing runs. That is, the database stores statistics of other customers who have previously converted to the SAP HANA database platform from other (e.g., older) systems.

It is noted that the UI screen of FIG. 3 provides further details regarding the respective contributions of sub-components to the business downtime. For example, the SUM component is further broken down into a Data transfer phase, and a XCLA/XPRA (where XPRA acronym for: "eXecute ABAP Program Automatically After Transport Request Import"). Similarly, the UI screen of FIG. 3 illustrates that the Finance conversion component of the business downtime includes the contribution if different clients (i.e., Client 080; Client 082).

As shown in FIG. 3, the engine of the prediction tool processes the two inputs that have been received, and provides a corresponding output including optimization recommendation(s) for reducing business downtime. Thus according to one recommendation 320, the prediction tool focuses upon the relative contribution of the SUM phase and the Finance conversion phase as potential avenues for optimization.

At 322, the UI offers a specific Downtime optimized Conversion (DoC) option, to achieve a total business downtime of less than eight hours (as compared to the thirteen+ hour downtime of the benchmark).

At 324, the UI references a specific "What-if analysis section" 326, providing certain approaches for reducing business downtime. Included in this section are switches for activating the following optimizations:
DoC,
Downtime optimized Database Migration Option (DoDMO),
Housekeeping, and
custom TRs.

Figure 4:
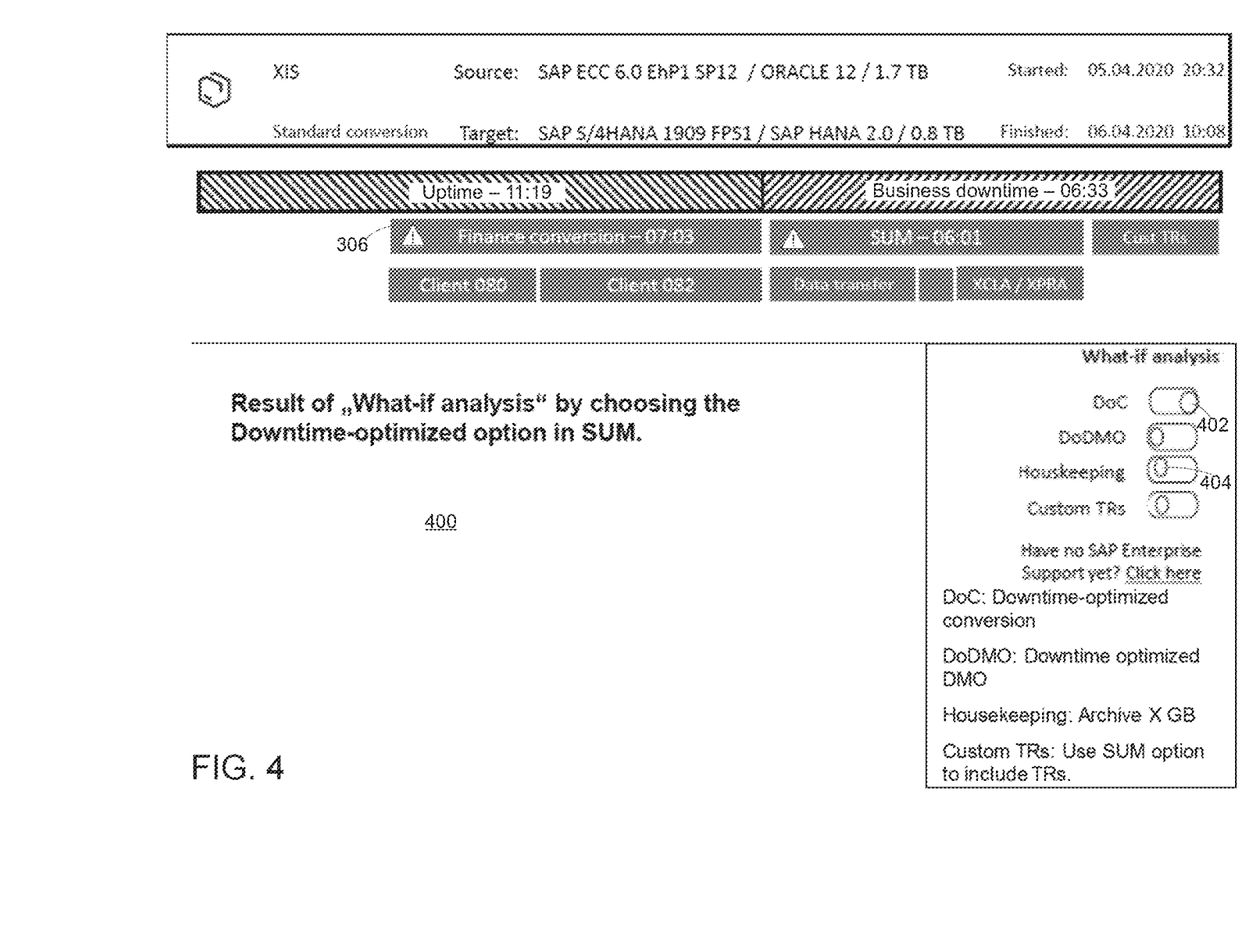

FIG. 4 shows a next screen 400 of the prediction tool UI, where the user has selected the DoC option 402. In particular, FIG. 4 shows that as a result of this optimization, the Finance conversion phase 306 is forecast to be shifted in its entirety to (business) Uptime, thereby reducing the predicted business downtime from 13:36 to only 6:33—a considerable savings in time that results in greater productivity for the customer.

If a user now selects the "Housekeeping" option 404, the size of the database is decreased by X Gigabyte. Upon referencing the conversion database, the engine can accurately predict an updated business downtime according to the new database size.

Figure 7:
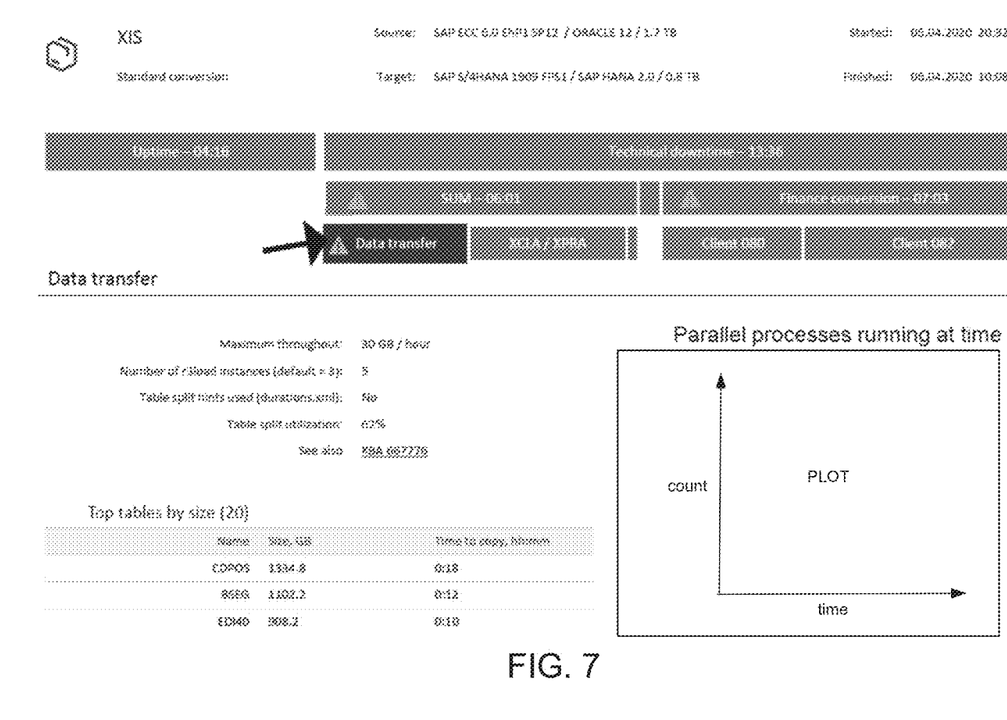
FIGS. 7-11 illustrate user interface screens of a downtime prediction program according to an example.

FIGS. 7-11 illustrate additional user interface screens of exemplary downtime prediction programs according to various embodiments. In particular, FIG. 7 shows a screen where a user is exploring the Data Transfer underphase. Various details regarding this aspect are shown, including a plot of parallel processes running over time.

Figure 8:
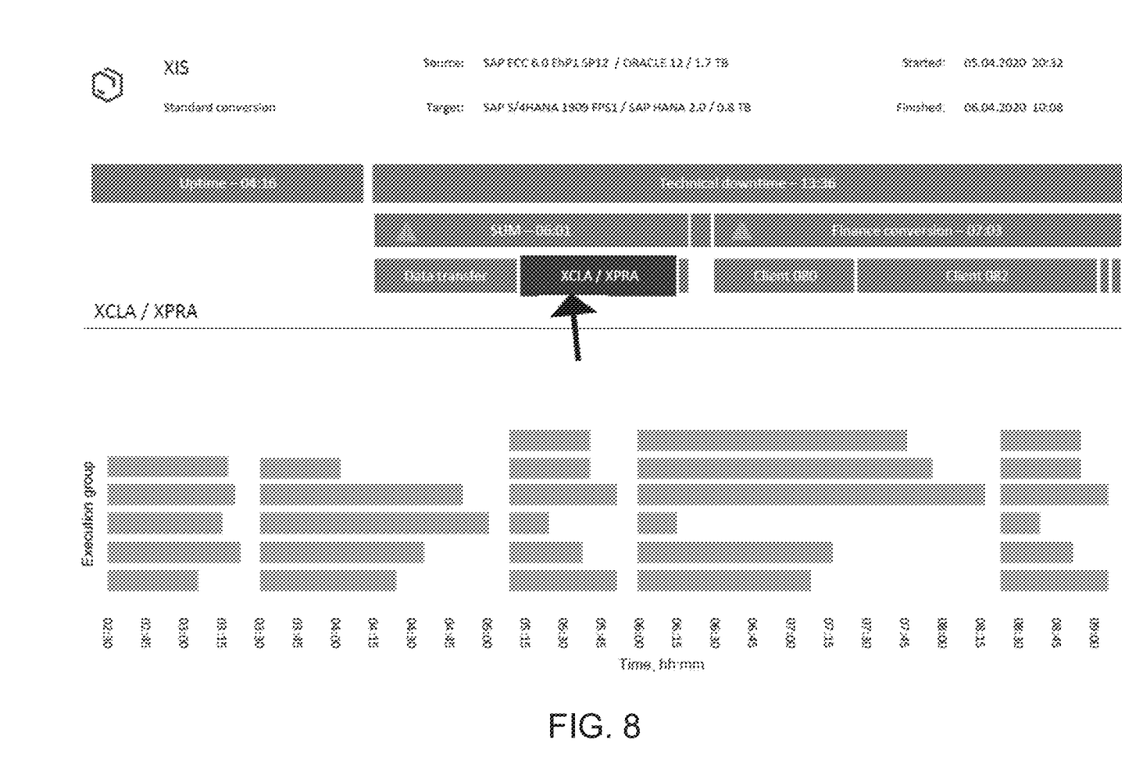

FIG. 8 shows a screen where a user is exploring the XCLA/XPRA underphase. Details regarding this aspect are shown, including parallel execution groups over time.

Figure 9:
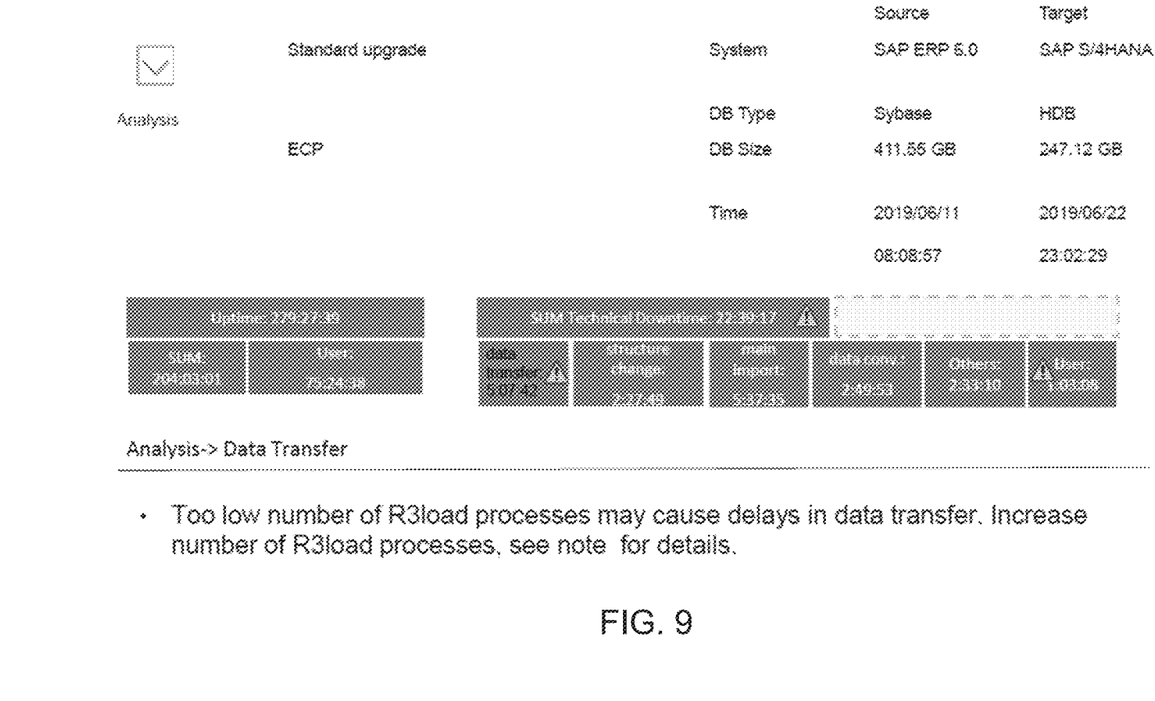

FIG. 9 shows a screen according to an example, where grayed boxes are employed to indicate runtime changes. In this case, the downtime is over the threshold, so the time is too high.

These processes can be optimized with different options. The options can be accessed with a link. The downtime prediction application can also suggest where optimization can be made, specifying one or more underphases.

Figure 10:
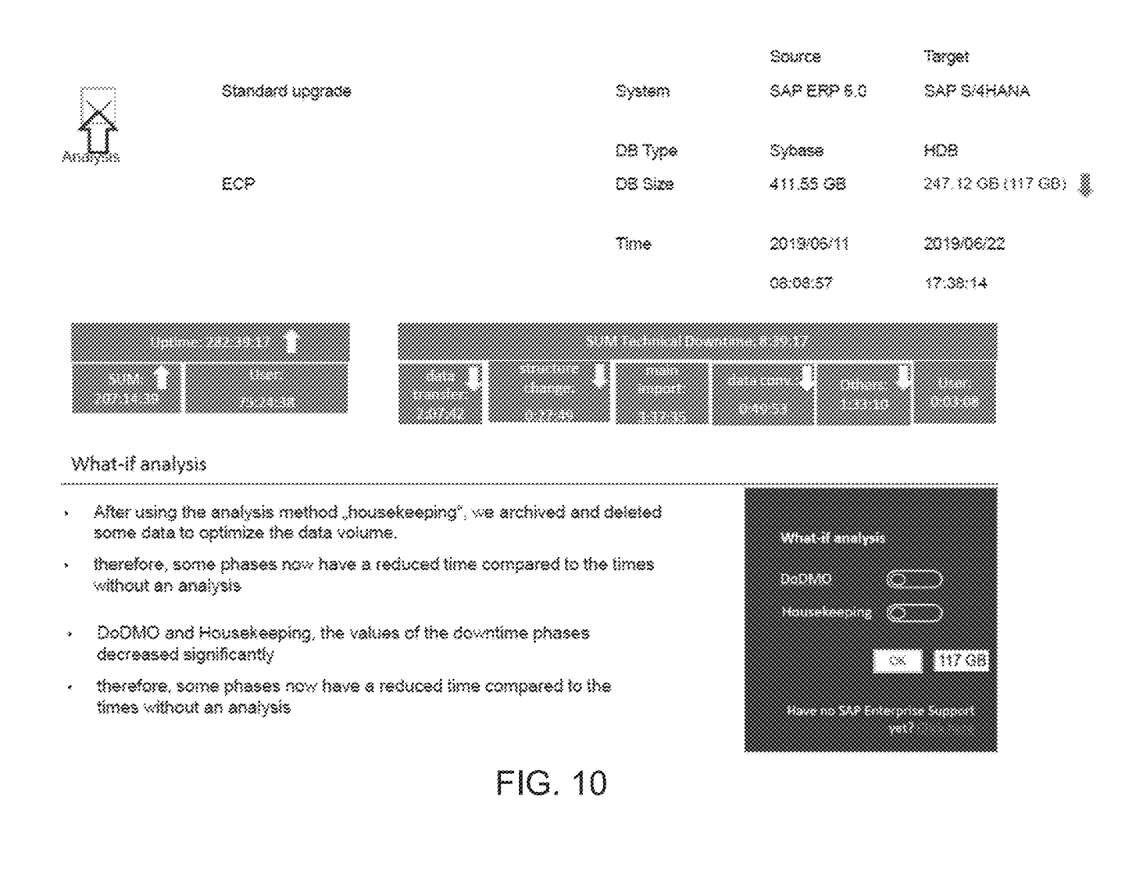

FIG. 10 is a simplified screen shot illustrating another example of the housekeeping function. In this case, the downtime is under the threshold. The strategy "housekeeping" has a simple but effective purpose. This strategy reduces the times of the different phases, because the size of the DB will be lowered. Under the housekeeping approach, the database size can be reduced with archiving and/or deleting some data.

Here, to analyze with the Housekeeping strategy, a toggle located in a tab on the lower right is chosen. The user inserts the estimated reduced size of the DB to be analyzed, with some threshold input value being defined.

Once the analysis is begun, as an output the user will receive the calculated values for conversion. The prediction application may also output text offering recommendations for the next steps.

Figure 11:
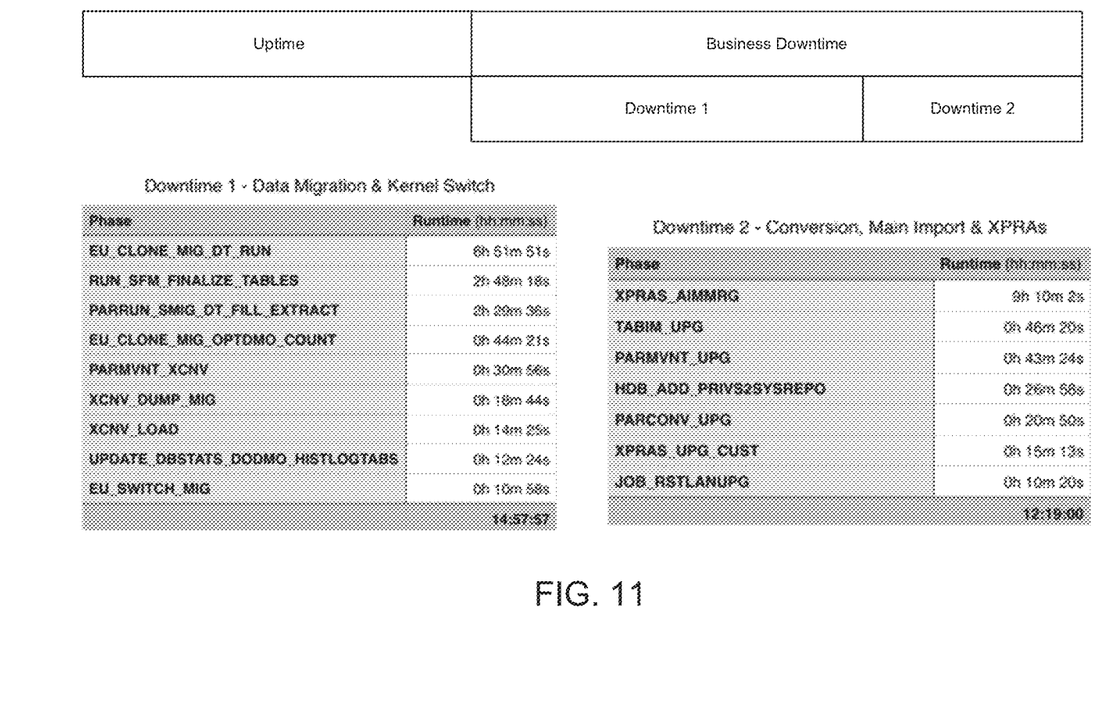

FIG. 11 shows yet another example of a simplified screen shot from a downtime prediction tool according to an embodiment. This figure shows that by selecting particular regions (e.g., the Downtime 1 duration bar), further details may be offered. Here, those details are shown as a table of durations of specific phases, thereby apprising the user of potential specific conversion activities that could benefit from further optimization.

The exemplary downtime prediction tool just described may offer various benefits. Specifically, in converting several SAP ERP system landscapes to SAP S/4HANA, each system has development (DEV), quality control/analysis (QUAL), and full production (PROD) variants. Strict requirements from business may demand keeping system downtime below eight hours (duration of the working shift).

The productive upgrade is prepared for by running procedure on a sandbox system (a fresh copy of the production system). Each time it is desired to improve runtimes and avoid errors in order to reach a downtime goal and guarantee a smooth upgrade.

The Technical Downtime Optimization app may be used in the Support Launch Pad to track duration improvements from run to run and analyze errors. The downtime prediction application allows checking for how well an upgrade is performing as compared to similar upgrades of other SAP customers. In particular, the instant application embodiment helps in understanding which realistic runtimes can be achieved with reasonable efforts.

The application informs users regarding applicable advanced downtime reduction options (e.g. zero-downtime optimized upgrade) and their potential for further reducing the downtime. Referencing the downtime prediction tool helps the user make a grounded suggestion to project business sponsors of employing one of these advanced options.

The application conserves time of the user by suggesting changes of configuration parameters of SUM and ABAP application server. Otherwise, the user may have to search through various notes to find this information.

Embodiments offer simple design, intuitive performance, and contextual tips. Upgrade durations are readily visualized, and the effect on optimization can be gleaned from a single glance on the duration chart.

The instant downtime prediction application connects the user with the know-how of upgrade experts within SAP, and its continuously evolving database technology. Embodiments can save time by removing guesswork in the repeated quest for optimizing downtime.

Returning now to FIG. 1, there the particular embodiment is depicted with the engine responsible for downtime prediction as being located outside of the conversion database. However, this is not required.

Rather, alternative embodiments could leverage the processing power of an in-memory database engine (e.g., the in-memory database engine of the HANA in-memory database available from SAP SE), in order to perform various functions as have been described herein.

Figure 5:
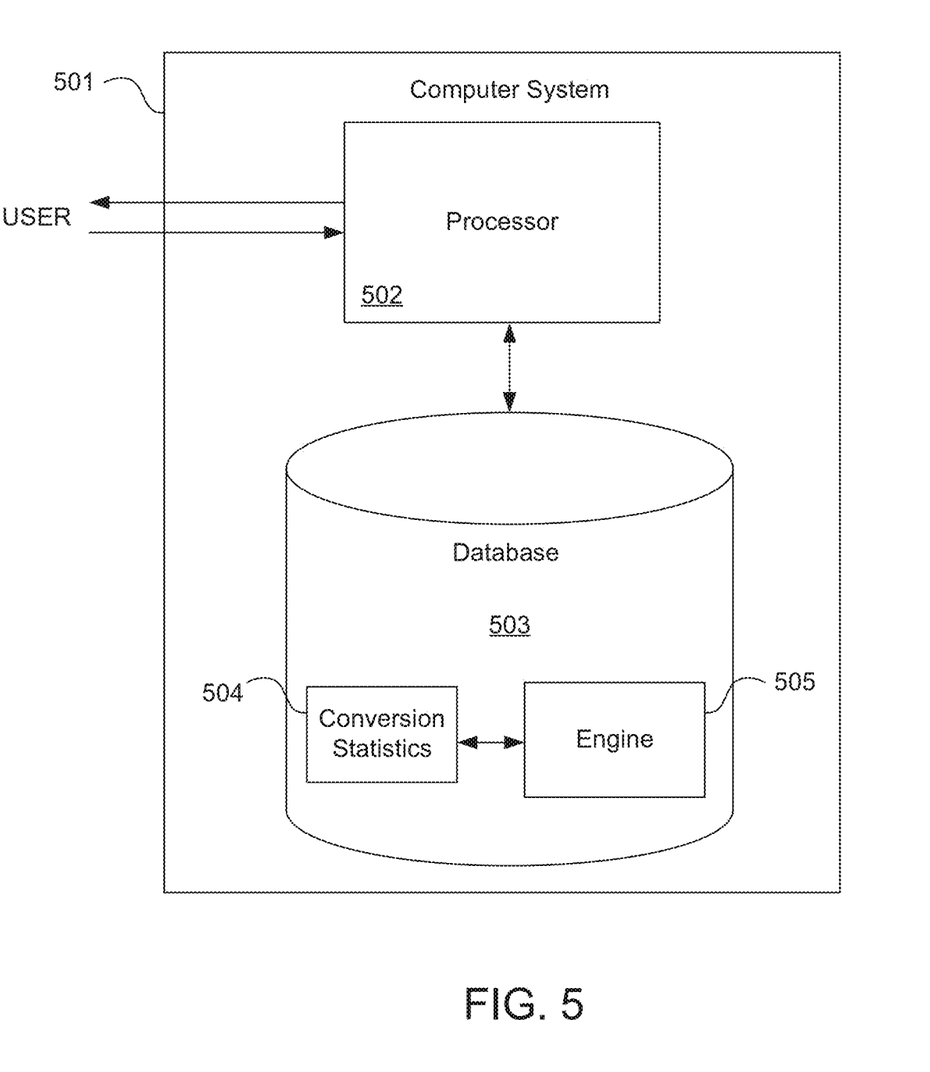
FIG. 5 illustrates hardware of a special purpose computing machine according to an embodiment that is configured to implement downtime prediction.

Thus FIG. 5 illustrates hardware of a special purpose computing machine configured to implement software conversion downtime prediction according to an embodiment. In particular, computer system 501 comprises a processor 502 that is in electronic communication with a non-transitory computer-readable storage medium comprising a database 503. This computer-readable storage medium has stored thereon code 505 corresponding to an engine. Code 504 corresponds to statistics compiled from previous conversion processes. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 6:
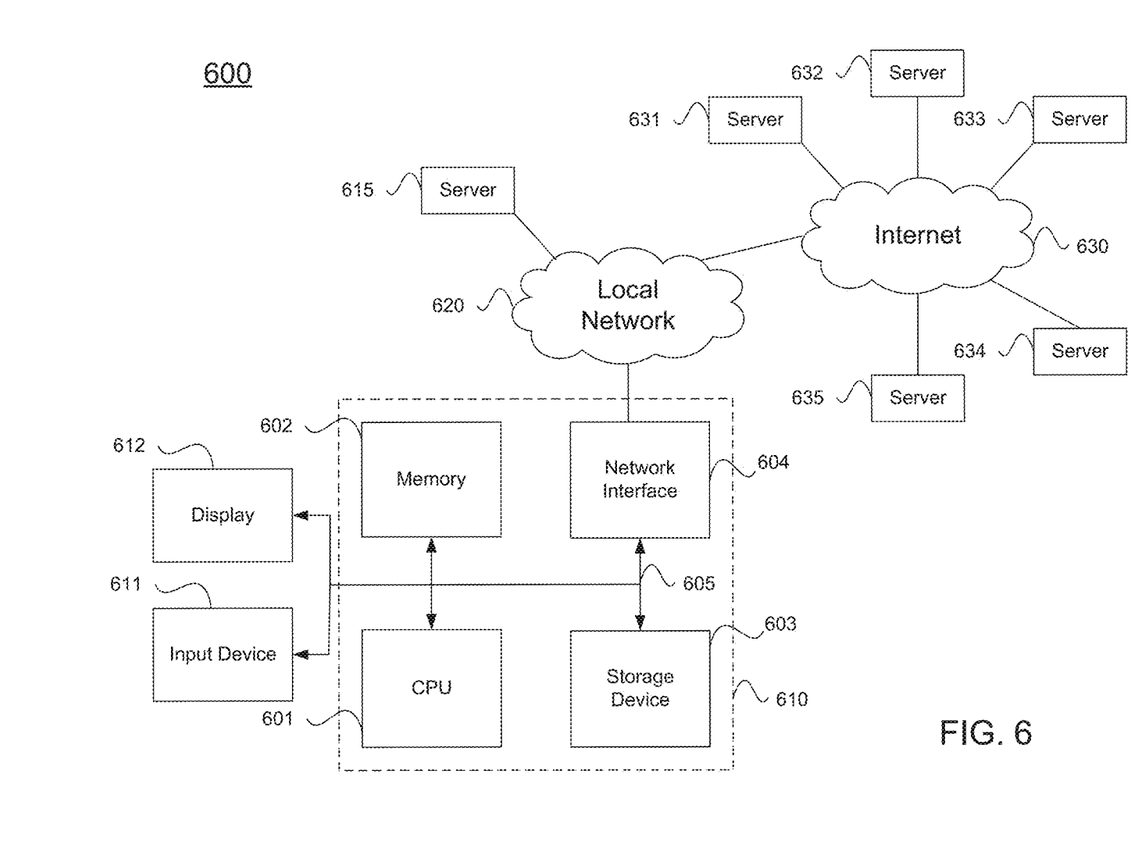
FIG. 6 illustrates an example computer system.

An example computer system 600 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable mediums.

Computer system 610 may be coupled via bus 605 to a display 612, such as a liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 504 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
   receiving, by an in-memory database engine of an in-memory database, a benchmark for a practice software conversion process test run to the in-memory database, the benchmark comprising an uptime component and a downtime component, the downtime component comprising a first constituent phase and a second constituent phase;
   displaying in a user interface, the benchmark including the downtime component;
   receiving, by the in-memory database engine, a statistic stored in the in-memory database and reflecting a prior software conversion process;
   the in-memory database engine generating a recommendation from the benchmark, wherein the processing is further performed in conjunction with an input accepting the recommendation;
   receiving, by the in-memory database engine from the user interface, a reduced database size for the conversion process test run;
   processing, by the in-memory database engine, the benchmark and the statistic with reference to the reduced database size and an expert rule set to generate an optimized result comprising an updated benchmark having a changed downtime component; and
   displaying in the user interface, the updated benchmark including the changed downtime component.

2. A method as in claim 1 wherein the processing is further performed in conjunction with an ad hoc input based upon the benchmark.

3. A method as in claim 1 further comprising the in-memory database adding to the conversion database, statistical data fed back from a formal software conversion run conducted according to the optimized result.

4. A method as in claim 1 wherein the changed downtime component is displayed as a bar having a first color different from a second color of a bar representing the uptime.

5. A method as in claim 1 wherein:
   the first constituent phase comprises a first constituent underphase; and
   displaying the business downtime comprises displaying the first constituent underphase proximate to the first constituent phase.

6. A non-transitory computer readable storage medium embodying a computer program for performing a method, said method comprising:
   receiving, by an in-memory database engine of an in-memory database, a benchmark for a practice software conversion process test run to the in-memory database, the benchmark comprising an uptime component and a downtime component, the downtime component comprising a first constituent phase and a second constituent phase;
   displaying in a user interface, the benchmark including the downtime component;
   receiving, by the in-memory database engine, a statistic stored in the in-memory database and reflecting a prior software conversion process;
   generating a recommendation from the benchmark, wherein the processing is further performed in conjunction with an input accepting the recommendation;

receiving, by the in-memory database engine from the user interface, a reduced database size for the conversion process test run;

processing, by the in-memory database engine, the benchmark and the statistic with reference to the reduced database size and acceptance of the recommendation and an expert rule set to generate an optimized result comprising an updated benchmark having a changed downtime component; and displaying in the user interface, the updated benchmark including the changed downtime component.

7. A non-transitory computer readable storage medium as in claim 6 further comprising adding to the in-memory database, statistical data fed back from a formal software conversion run conducted according to the optimized result.

8. A non-transitory computer readable storage medium as in claim 6 wherein the changed downtime component is displayed with a first color different from a second color of a bar representing the uptime.

9. A non-transitory computer readable storage medium as in claim 8 wherein the changed downtime component is displayed as a bar labeled with a time duration.

10. A computer system comprising:

one or more processors;

a software program, executable on said computer system, the software program configured to cause an in-memory database engine of an in-memory database to:

receive a benchmark for a practice software conversion process test run to the in-memory database, the benchmark comprising an uptime component and a downtime component, the downtime component comprising a first constituent phase and a second constituent phase;

display in a user interface, the benchmark including the downtime component;

receive a statistic stored in the in-memory database and reflecting a prior software conversion process;

generate a recommendation from the benchmark;

process the benchmark and the statistic further in conjunction with an input accepting the recommendation;

receive from the user interface, a reduced database size for the conversion process test run;

process the benchmark and the statistic with reference to the reduced database size and an expert rule set to generate an optimized result comprising an updated benchmark having a changed downtime component; and display in the user interface, the updated benchmark including the changed downtime component.

11. A computer system as in claim 10 wherein the in-memory database engine is further configured to add to the in-memory database, statistical data fed back from a formal software conversion run conducted according to the optimized result.

12. A computer system as in claim 10 wherein the changed downtime component is displayed in a first color different from the uptime component.

13. A computer system as in claim 10 wherein the changed downtime component is displayed as a bar labeled with a time duration.

* * * * *